(12) United States Patent
Tsuji

(10) Patent No.: US 11,370,298 B2
(45) Date of Patent: Jun. 28, 2022

(54) WORK VEHICLE

(71) Applicant: Iseki & Co., LTD, Ehime-ken (JP)

(72) Inventor: Hidekazu Tsuji, Ehime-ken (JP)

(73) Assignee: Iseki & Co., LTD., Matusyama (JP)

( * ) Notice: Subject to any disclaimer, the term of this patent is extended or adjusted under 35 U.S.C. 154(b) by 295 days.

(21) Appl. No.: 16/695,620

(22) Filed: Nov. 26, 2019

(65) Prior Publication Data

US 2020/0164741 A1 May 28, 2020

(30) Foreign Application Priority Data

Nov. 28, 2018 (JP) .............................. JP2018-222695

(51) Int. Cl.
| | | |
|---|---|---|
| *B60K 17/34* | (2006.01) | |
| *B60K 17/02* | (2006.01) | |
| *B60K 17/22* | (2006.01) | |
| *G01M 13/021* | (2019.01) | |
| *F16D 13/52* | (2006.01) | |
| *F16D 25/12* | (2006.01) | |

(52) U.S. Cl.
CPC .............. *B60K 17/34* (2013.01); *B60K 17/02* (2013.01); *B60K 17/22* (2013.01); *G01M 13/021* (2013.01); *B60Y 2200/221* (2013.01); *F16D 13/52* (2013.01); *F16D 25/12* (2013.01)

(58) Field of Classification Search
CPC ........ B60K 17/34; B60K 17/02; B60K 17/22; B60Y 2200/221
See application file for complete search history.

(56) References Cited

U.S. PATENT DOCUMENTS

| | | | | | |
|---|---|---|---|---|---|
| 4,362,070 | A | * | 12/1982 | Murayama | ............ F16H 37/086 475/217 |
| 4,484,488 | A | * | 11/1984 | Kato | ........................ F16H 3/16 74/361 |
| 4,628,768 | A | * | 12/1986 | Omura | ................... B60K 17/08 74/329 |
| 4,792,010 | A | * | 12/1988 | Kitao | ................. B60K 17/3505 180/233 |
| 4,794,807 | A | * | 1/1989 | Horii | ...................... B60K 17/28 74/15.66 |

(Continued)

FOREIGN PATENT DOCUMENTS

JP          11-192849 A        7/1999

*Primary Examiner* — Tony H Winner
*Assistant Examiner* — Michael R Stabley
(74) *Attorney, Agent, or Firm* — Finnegan, Henderson, Farabow, Garrett & Dunner, LLP

(57) ABSTRACT

A work vehicle includes front and rear wheels, a transmission case and a power transmission device. The power transmission device is housed in the transmission case and is configured to transmit driving power from an engine to driving wheels. The power transmission device has a front wheel driving shaft and a four-wheel drive clutch. The front wheel driving shaft is arranged in a lower inside portion of the transmission case and is configured to transmit the driving power to the front wheels. The four-wheel drive clutch is arranged above the front wheel driving shaft, and is configured to switch between a two-wheel drive state in which the driving power is transmitted to the rear wheels, and a four-wheel drive state in which the driving power is transmitted to both the front wheels and the rear wheels via the front wheel driving shaft.

17 Claims, 4 Drawing Sheets

(56) References Cited

U.S. PATENT DOCUMENTS

| | | | | |
|---|---|---|---|---|
| 4,804,060 | A * | 2/1989 | Iritani | B60K 17/22 |
| | | | | 180/233 |
| 4,824,128 | A * | 4/1989 | Takagi | B60K 17/02 |
| | | | | 180/365 |
| 6,112,842 | A * | 9/2000 | Ura | B60K 17/348 |
| | | | | 172/2 |
| 6,360,623 | B1 * | 3/2002 | Matsufuji | F16H 37/043 |
| | | | | 74/15.66 |
| 7,152,704 | B2 * | 12/2006 | Uemura | A01D 69/00 |
| | | | | 180/6.24 |
| 7,337,870 | B2 * | 3/2008 | Izukura | F16H 59/06 |
| | | | | 180/307 |
| 7,712,573 | B2 * | 5/2010 | Sakamoto | F16H 47/04 |
| | | | | 180/374 |
| 7,735,594 | B2 * | 6/2010 | Hidaka | B62D 49/06 |
| | | | | 180/312 |
| 7,900,737 | B2 * | 3/2011 | Isogai | B60T 7/06 |
| | | | | 180/305 |
| 8,944,193 | B2 * | 2/2015 | Sagawa | B60K 17/04 |
| | | | | 180/53.6 |
| 9,783,042 | B2 * | 10/2017 | Kurokawa | F01N 3/103 |
| 9,944,292 | B2 * | 4/2018 | Tsuji | B60K 17/34 |
| 10,245,947 | B2 * | 4/2019 | Oba | B60K 5/00 |
| 10,272,774 | B2 * | 4/2019 | Hashimoto | B60K 23/08 |
| 2017/0217309 | A1 * | 8/2017 | Hashimoto | B60T 1/062 |
| 2017/0219076 | A1 * | 8/2017 | Hashimoto | F16H 47/04 |
| 2018/0231124 | A1 * | 8/2018 | Daiyakuji | F16H 47/02 |
| 2019/0061522 | A1 * | 2/2019 | Oba | B60K 17/04 |

* cited by examiner

WORK VEHICLE

CROSS REFERENCE TO RELATED APPLICATIONS

This application claims priority to Japanese Patent Application No. 2018-222695, filed Nov. 28, 2018, the disclosure of which is incorporated herein by reference in its entirety.

BACKGROUND

The present disclosure relates to a work vehicle.

Conventionally, work vehicles have been known in which a power transmission device is housed in a transmission case arranged below a vehicle body and the power transmission device includes a front wheel driving shaft for transmitting a driving power from an engine to front wheels. Such work vehicles may also have a four-wheel drive clutch for switching between a two-wheel drive (2WD) state in which only rear wheels act as driving wheels, and a four-wheel drive (4WD) state in which both the front wheels and the rear wheels act as the driving wheels.

Also, among such work vehicles, there are work vehicles in which the front wheel driving shaft is arranged in a lower inside portion of the transmission case and the four-wheel drive clutch, which is larger in diameter than the front wheel driving shaft, is provided coaxially on the front wheel driving shaft (see e.g., Japanese Patent Application Pub. No. JP-A-11-192849).

SUMMARY

However, in conventional work vehicles such as those described above, the four-wheel drive clutch is provided coaxially on the front wheel driving shaft arranged in the lower inside portion of the transmission case. Therefore, a size of the transmission case has to be increased in accordance with a size of the four-wheel drive clutch, so that the four-wheel drive clutch can be housed therein. Thus, the conventional work vehicles have room for improvement in terms of downsizing the transmission case.

The present invention has been made keeping in mind the above problems, and an object thereof is to provide a work vehicle, in which downsizing of a transmission case may be achieved.

In order to address such technical concerns as those described above and also to achieve the object, a work vehicle may be provided. A work vehicle (1) according to a first aspect of the present disclosure includes a pair of left and right front wheels (4) and a pair of left and right rear wheels (5) each provided on a machine body frame (2); a transmission case (6) arranged below the machine body frame (2); and a power transmission device (7) housed in the transmission case (6) and configured to transmit a driving power from an engine (E) to driving wheels, wherein the power transmission device (7) includes a front wheel driving shaft (76) arranged in a lower inside portion of the transmission case (6) and configured to transmit the driving power to the front wheels (4); and a four-wheel drive clutch (78) arranged at a location in the transmission case (6), which is located above the front wheel driving shaft (76), wherein the four-wheel drive clutch (78) is configured to switch between a two-wheel drive state, in which the driving power is transmitted to the rear wheels (5) and thus only the rear wheels (5) act as the driving wheels, and a four-wheel drive state, in which the driving power is transmitted to the front wheels (4) and the rear wheels (5) via the front wheel driving shaft (76) and thus both the front wheels (4) and the rear wheels (5) act as the driving wheels.

A work vehicle (1) according to a second aspect of the present disclosure is the work vehicle (1) according to the first aspect and further characterized in that the power transmission device (7) further includes a rear wheel driving shaft (752) for driving the rear wheels (5); and a four-wheel drive input shaft (79) configured to receive the driving power from the rear wheel driving shaft (752) and then to transmit the driving power to the four-wheel drive clutch (78), wherein the four-wheel drive input shaft (79) is provided coaxially with the front wheel driving shaft (76), and an end portion (792) of the four-wheel drive input shaft (79) on a downstream side in terms of power transmission is loosely fitted with an end portion (762) of the front wheel driving shaft (76) on an upstream side in terms of power transmission.

According to the first aspect of the present disclosure, the four-wheel drive clutch, which may be larger in diameter than the front wheel driving shaft, is not provided coaxially on the front wheel driving shaft, but is arranged at a location in the transmission case that is located above the front wheel driving shaft. Therefore, it is possible to increase a ground clearance of the transmission case and also to downsize and compactify the transmission case.

According to the second aspect of the present invention, the four-wheel drive input shaft is loosely fitted with the front wheel driving shaft. Therefore, in addition to the effect of the first aspect of the present invention, the effect is achieved that positioning of the front wheel driving shaft, the four-wheel drive input shaft and the four-wheel drive clutch can be easily performed upon assembly of the power transmission device.

Objects and advantages of the disclosed embodiments may be realized and attained by the elements and combinations that may be set forth in the claims. However, embodiments of the present disclosure are not necessarily required to achieve such exemplary objects and advantages, and some embodiments may not achieve any of the objects and advantages discussed above.

DESCRIPTION OF EXEMPLARY EMBODIMENTS

Now, embodiments of a work vehicle disclosed herein will be described in detail with reference to the accompanying drawings. Meanwhile, the present invention is not limited to the embodiments as described below.

Summary of Work Vehicle (Tractor) 1.

Figure 1:
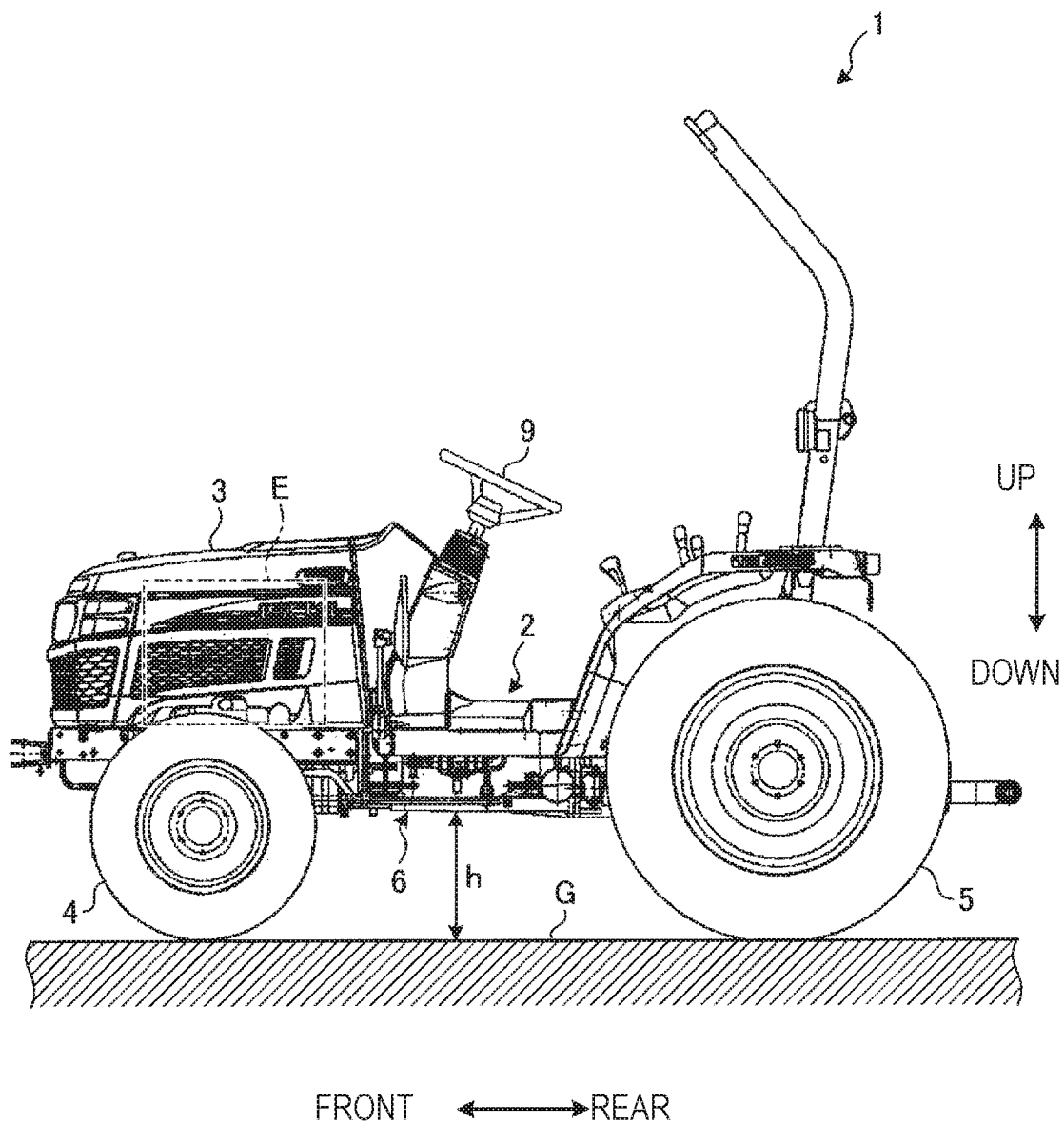
FIG. 1 is a schematic left side view showing a work vehicle according to an embodiment.
Figure 2:
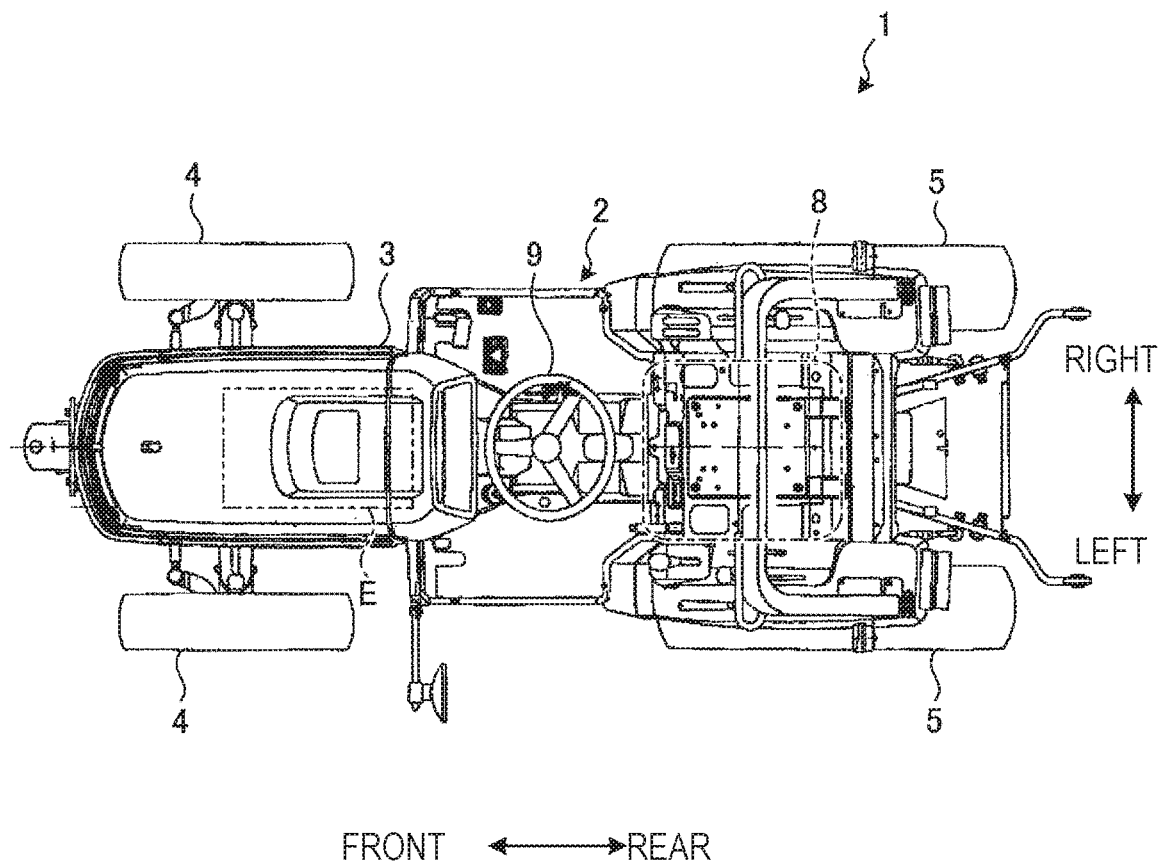
FIG. 2 is a schematic plan view showing the work vehicle according to the embodiment.

First, a summary of a work vehicle 1 will be described with reference to FIGS. 1 and 2. FIG. 1 is a schematic left side view showing a work vehicle 1 according to an embodiment. FIG. 2 is a schematic plan view showing the work vehicle 1 according to the embodiment. Meanwhile, in the following description, a tractor will be described as an example of the work vehicle 1. The tractor 1, which may be the work vehicle, is an agricultural tractor which is intended to perform work on a farm field or the like while being self-propelled.

Further, in the following description, a front and rear direction is a travelling direction of the tractor 1 during straight travel, and a front side of the travelling direction is defined as "front" and a rear side thereof is defined as "rear". The travelling direction of the tractor 1 is a direction from an operator seat 8 (as described below) toward a steering wheel 9 during straight travel (see FIG. 2).

A left and right direction is a direction horizontally perpendicular to the front and rear direction, and thus left and right sides are defined toward the "front" side. That is, in a state where an operator (also referred to as a worker) of the tractor 1 sits on the operator seat 8 toward the front side, the left hand side is defined as "left" and the right hand side is defined as "right".

An upward and downward direction is a vertical direction. The front and rear direction, the left and right direction and the upward and downward direction are perpendicular to each other. Meanwhile, the directions are defined for the sake of convenience of explanation, and accordingly, the present invention is not limited to these directions. Further, in the following description, the tractor 1 may also referred to as a "machine body".

As shown in FIGS. 1 and 2, the tractor 1 includes a machine body frame 2, an engine E, a bonnet 3, front wheels 4, rear wheels 5 and a transmission case 6. The machine body frame 2 is a main frame for supporting the machine body. The engine E, which is a driving source for the machine body, is a heat engine, such as a diesel engine or a gasoline engine. The bonnet 3 is provided on a front portion of the machine body to be opened and closed and thus to cover the engine E in a closed state.

The front wheels 4 include a pair of right and left wheels and are provided on a front portion of the machine body frame 2. The front wheels 4 may be wheels for steering, i.e., steered wheels. The rear wheels 5 include a pair of right and left wheels and are provided on a rear portion of the machine body frame 2. The rear wheels 5 may be wheels for driving, i.e., driving wheels. Meanwhile, the tractor 1 may be configured to be convertible between a two-wheel drive (2WD), in which only the rear wheels 5 are driving wheels, and a four-wheel drive (4WD), in which both the front wheels 4 and the rear wheels 5 are driving wheels.

Figure 3A:
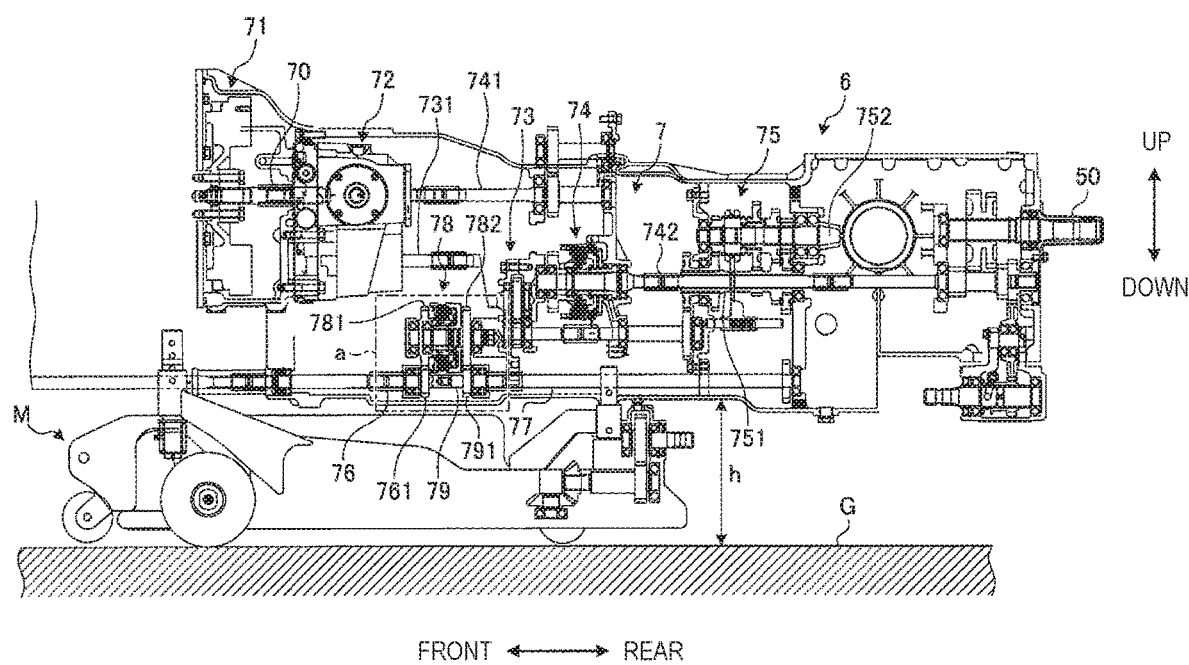
FIG. 3A is a schematic left side sectional view showing a power transmission device.

The transmission case 6 houses a power transmission device 7, which is a speed-changing mechanism (see FIG. 3A). In the transmission case 6, a driving power (rotational power) from the engine E is transmitted to the driving wheels, as described below, or a PTO (Power Take-off) shaft 50 (see FIG. 3A) after a speed thereof is properly reduced by the power transmission device 7.

Also, the tractor 1 has an operator seat 8 and a steering wheel 9 on an upper portion of the machine body frame 2 and at the rear of the bonnet 3, which constitute a cockpit of the tractor 1. The operator seat 8 is provided on the rear portion of the machine body frame 2. The operator seat 8 is a seat for an operator. The steering wheel 9 is provided in front of the operator seat 8. The steering wheel 9 is operated by the operator when steering the front wheels 4, which are also the steered wheels.

Further, in addition to the operator seat 8 and the steering wheel 9, the cockpit of the tractor 1 includes a meter panel for displaying various information; various operation pedals, such as an accelerator pedal, a clutch pedal and a brake pedal; and various operation levers, such as a forward/reverse lever, a main shift lever and a sub-shift lever.

Also, the tractor 1 has a work machine, such as a rotary tiller, mounted, for example, on the rear of the machine body. The work machine is driven by the PTO shaft 50 protruding rearward from the rear portion of the transmission case 6. The PTO shaft 50 is configured to transmit the rotational power, which is outputted from the engine E, to the work machine, which is performing work on a farm field. In addition to the PTO shaft 50, the tractor 1 has a lift arm for connecting the work machine thereto and the like at the rear of the machine body.

Further, the tractor 1 may have a mid-mower M, such a lawn mower (see FIG. 3A), provided below the machine body, e.g., between the transmission case 6 and a ground surface G.

Power Transmission Device 7

Figure 3B:
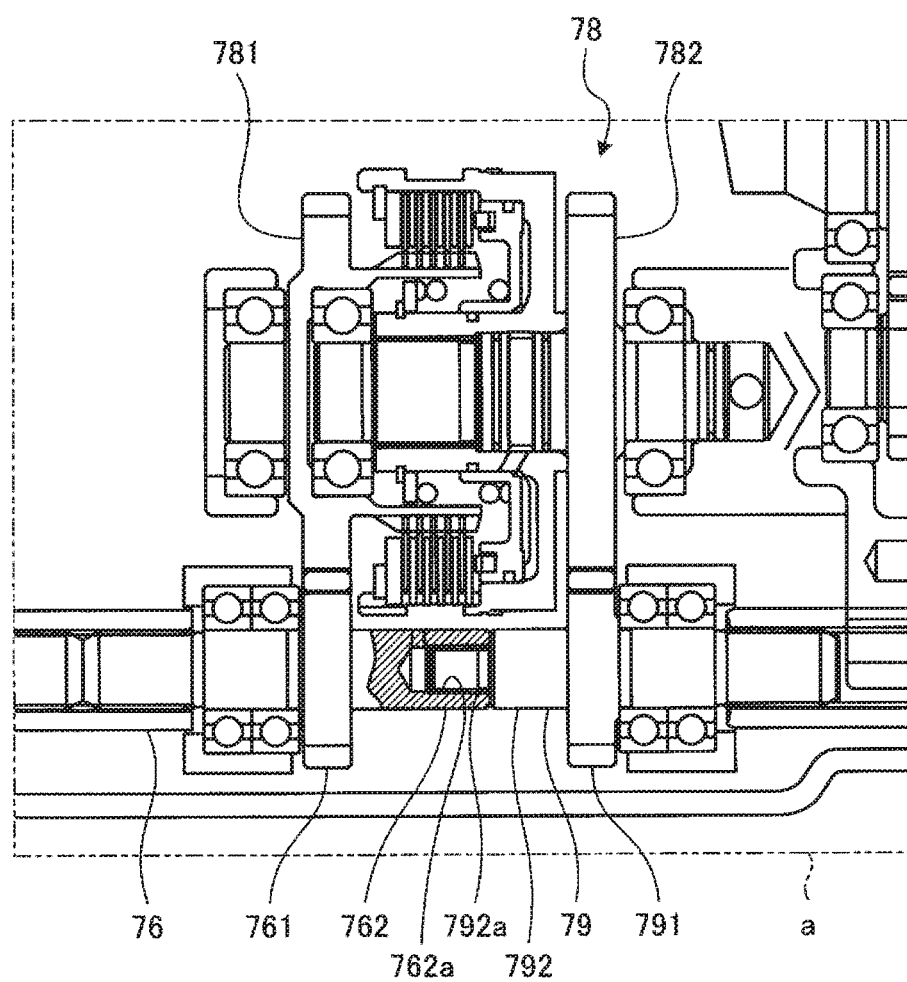
FIG. 3B is an enlarged view of a section "a" shown in FIG. 3A.

Next, the power transmission device 7 will be described with reference to FIGS. 3A and 3B. FIG. 3A is a schematic left side sectional view showing the power transmission device 7. FIG. 3B is an enlarged view of a section "a" shown in FIG. 3A and corresponds to a schematic left side sectional view showing a four-wheel drive clutch 78. Meanwhile, in the example shown in FIG. 3A, the mid-mower M, such as a lawn mower, is provided between the transmission case 6 and the ground surface G.

As shown in FIG. 3A and also described above, the power transmission device 7 is housed in the transmission case 6 arranged below the machine body frame 2 (see FIG. 1). The transmission case 6 is a hollow case and is formed by connecting three members, for example, a front case, a mid-case and a rear case, with each other in the front and rear direction.

As shown in FIG. 3A, an input shaft 70 is connected to the power transmission device 7 via a main clutch 71. The power transmission device 7 has a speed-changing mechanism configured to speed-change a rotational power from the engine E (see FIG. 1) and then to output the rotational power to various parts. Meanwhile, the input shaft 70 is also an input shaft of the speed-changing mechanism.

The speed-changing mechanism includes a hydrostatic continuously variable transmission 72, which is configured to switch forward/reverse stages and main shift stages, and a sub-transmission mechanism 75. Meanwhile, the hydrostatic continuously variable transmission 72 can continuously change forward and reverse gear ratios and other gear shift ratios, and the sub-transmission mechanism 75 has a plurality of shift stages.

The hydrostatic continuously variable transmission 72 can transmits the rotational power, which is inputted to the input shaft 70 thereof, to a main shift output shaft 731. Also, when transmitting the rotational power to the main shift output shaft 731, the hydrostatic continuously variable transmission 72 can transmit the rotational power after switching a rotation direction thereof depending on operation of the forward/reverse lever.

Further, the hydrostatic continuously variable transmission 72 can continuously change a ratio of a rotational speed of the main shift output shaft 731 to a rotational speed of the input shaft 70 by changing a capacity of a piston acting on a hydraulic pump and a hydraulic motor, both which are provided inside the hydrostatic continuously variable transmission 72.

The sub-transmission mechanism (sub-transmission synchromesh) 75 can receive the rotational power from the hydrostatic continuously variable transmission 72 via a sub-transmission mechanism input portion 751 provided on a PTO drive shaft 742. The sub-transmission mechanism 75 can output the rotational power, which is received from the hydrostatic continuously variable transmission 72, via a rear wheel driving shaft 752, which is an output shaft of the sub-transmission mechanism 75, after changing a gear shift ratio thereof depending on operation of the sub-shift lever.

Also, the power transmission device 7 includes a PTO output mechanism, a PTO clutch 74 and a PTO speed-changing device. The PTO output mechanism is configured to transmit the rotational power from the engine E to the PTO shaft 50. The PTO output mechanism can receive the rotational power from the input shaft 70.

The PTO clutch is configured to switch between "ON (connection)" and "OFF (disconnection)" of the rotational power toward the PTO shaft 50. The PTO clutch 74 is a multiplate friction clutch operated by a hydraulic pressure, e.g., a hydraulic clutch. The PTO speed-changing device is configured to speed-change the power to be transmitted to the PTO shaft 50.

In addition, the tractor 1 may have a sensitivity adjusting dial for changing (e.g., adjusting) a degree of pressure increase of the hydraulic pressure (e.g., pressure of hydraulic oil) upon connection of the PTO clutch 74, so that the operator can manually switch the sensitivity adjusting dial depending on the type of work. Thus, connection of the PTO clutch can be properly performed such that a clutch connection sensitivity becomes good, and the like.

Further, as shown in FIGS. 3A and 3B, the power transmission device 7 has a front wheel driving shaft 76, a rear-wheel-power-diverter shaft 77, a four-wheel drive clutch 78 and a four-wheel drive input shaft 79.

The front wheel driving shaft 76 is arranged in a lower inside portion of the transmission case 6 so as to extend in the front and rear direction inside the transmission case 6. The front wheel driving shaft 76 is configured to transmit the rotational power from the engine E to the front wheels 4 (see FIGS. 1 and 2), thereby driving the front wheels 4.

The rear-wheel-power-diverter shaft 77 is configured to receive a rotational power diverted from the rear wheel driving shaft 752 for driving the rear wheels 5 (see FIGS. 1 and 2). The four-wheel drive clutch 78 is configured to cause the rotation power, which is transmitted from the rear-wheel-power-diverter shaft 77 to the four-wheel drive input shaft 79, to be switched between "ON (connection)" and "OFF (disconnection)" with respect to the front wheel driving shaft 76. The four-wheel drive clutch 78 is a multiplate friction clutch operated by a hydraulic pressure, e.g., a hydraulic clutch.

Also, the four-wheel drive clutch 78 is configured to switch between a state in which the rotational power is transmitted from the rear wheel driving shaft 752 to the front wheels 4, and a state in which the rotational power is not transmitted to the front wheels 4, thereby switching between the four-wheel drive (4WD) and the two-wheel drive (2WD).

Specifically, if the four-wheel drive clutch 78 is connected, the rotational power inputted thereto through an input gear 782 is transmitted to an output gear 781 via the four-wheel drive clutch 78, and then the rotational power is transmitted to the front wheel driving shaft 76 through a gear 761. Therefore, the tractor 1 enters a four-wheel drive (4WD) state, in which both the front wheels 4 and the rear wheels 5 act as driving wheels.

In addition, the power transmission device 7 may further include a front wheel multiplying gear. In this case, for example, if the four-wheel drive clutch 78 is connected to the front wheel multiplying gear, the rotational power outputted from the output gear 781 via the four-wheel drive clutch 78 is speed-increased, for example, through a first multiplying gear, a second multiplying gear and the like, and then transmitted to the front wheel driving shaft 76. In this way, a four-wheel drive (4WD) configuration having a multiplied front wheel speed can be obtained.

If the four-wheel drive clutch 78 becomes a neutral state, no rotational power is transmitted to the front wheels 4. As a result, the tractor 1 enters a two-wheel drive (2WD) state, in which only the rear wheels 5 act as driving wheels.

Herein, the four-wheel drive clutch 78 has a diameter larger than the front wheel driving shaft 76. For example, if the four-wheel drive clutch 78 is provided coaxially on the front wheel driving shaft 76, a space for receiving therein the four-wheel drive clutch 78, which is larger in diameter than the front wheel driving shaft 76, has to be secured in the lower inside portion of the transmission case 6, thereby hindering downsizing of the transmission case 6. Therefore, in order to achieve downsizing of the transmission case 6, the present embodiment has a configuration in which the four-wheel drive clutch 78 is not provided on the front wheel driving shaft 76. Rather, the four-wheel drive clutch 78 may be arranged offset from the front wheel driving shaft 76.

Specifically, the four-wheel drive clutch 78 is provided on a separate shaft from the front wheel driving shaft 76. The four-wheel drive clutch 78 is arranged at a location in the transmission case 6 that is located above the front wheel driving shaft 76. The four-wheel drive input shaft 79 is configured to transmit the rotational power from the rear-wheel-power-diverter shaft 77 to the four-wheel drive clutch 78 through the gear 791. In addition, the four-wheel drive clutch 78 is preferably arranged to be offset from the front wheel driving shaft 76 in the left and right direction as well as the upward and downward direction. That is, the four-wheel drive clutch 78 is arranged obliquely above the front wheel driving shaft 76.

Further, the four-wheel drive input shaft 79 is provided coaxially with the front wheel driving shaft 76 in such a manner that an end portion 792 thereof, which corresponds to a downstream side in terms of power transmission, faces an end portion 762 of the front wheel driving shaft 76, which corresponds to an upstream side in terms of power transmission. A circular-cylindrical convex portion 792a provided on an end surface of the end portion 792 of the four-wheel drive input shaft 79 is fitted into a circular concave portion 762a formed on an end surface of the end portion 762 of the front wheel driving shaft 76. In this case, the convex portion 792a of the end portion 792 of the four-wheel drive input shaft 79 is loosely fitted into the concave portion 762a of the end portion 762 of the front wheel driving shaft 76, so that a gap is defined between the convex portion 792a and an inner wall of the concave portion 762a.

Meanwhile, the transmission case 6 is configured such that an inner wall thereof is arranged close to the four-wheel drive clutch 78. The inner wall may be adjacent to the four-wheel drive clutch 78. Also, a boss is provided on the inner wall of the transmission case 6. The boss has a rotational sensor attached thereto. The rotational sensor is configured to detect rotation of a gear for driving the four-wheel drive clutch 78, for example, unevenness of the gear in a non-contact manner. For example, the rotational sensor may be configured to sense a tooth of a gear passing by the sensor. By configuring in this way, a rotational speed can be detected using a rotational shaft at the rear stage of the sub-transmission mechanism 75, e.g., on a downstream side of the sub-transmission mechanism 75 in terms of power transmission, thereby allowing detection of a vehicle speed regardless of a position of the sub-transmission mechanism 75.

In this case, the rotational sensor is preferably provided in a groove formed in an outer circumferential surface of the four-wheel drive clutch 78. In this way, the rotational sensor is provided at a location close to the inner wall of the transmission case 6, thereby facilitating attachment of the rotational sensor.

According to the work vehicle 1 of the foregoing embodiment, the four-wheel drive clutch 78, which is larger in diameter than the front wheel driving shaft 76, is not provided coaxially on the front wheel driving shaft 76, but arranged at a location in the transmission case 6, which is located above the front wheel driving shaft 76. Therefore, it is possible to increase a ground clearance h of the transmission case 6 and also to downsize and compactify the transmission case 6.

Also, in the case where a mid-mower M, such as a lawn mower, is provided below the transmission case 6, a space required to lift the mid-mower M can be secured due to the increased ground clearance h of the transmission case 6. The mid-mower M may be one example of an implement powered by the engine E that is provided below the transmission case 6.

Further, the input gear 782 and the output gear 781 for the four-wheel drive clutch 78 are provided to sandwich the four-wheel drive clutch 78 at front and rear sides thereof. The gear 791 of the four-wheel drive input shaft 79 is provided at the same position as that of the input gear 782 in terms of a front and rear direction positional relationship, and the gear 761 of the front wheel driving shaft 76 is provided at the same position as that of the output gear 781 in terms of the front and rear direction positional relationship.

In addition, between the gear 791 of the four-wheel drive input shaft 79 and the gear 761 of the front wheel driving shaft 76, the four-wheel drive input shaft 79 is loosely fitted with the front wheel driving shaft 76. Therefore, upon assembly of the power transmission device 7, positioning of the front wheel driving shaft 76, the four-wheel drive input shaft 79 and the four-wheel drive clutch 78 can be performed in a compact and easy manner without using new bearings.

As a result, the four-wheel drive clutch 78, which is larger in diameter than that of the front wheel driving shaft 76, can be arranged close to the front wheel driving shaft 76 and the four-wheel drive input shaft 79 in such a manner to enter between the gear 791 and the gear 761. Meanwhile, even if the four-wheel drive input shaft 79 is loosely fitted into the front wheel driving shaft 76, there is no significant difference in rotational speed between the front wheel driving shaft 76 and the four-wheel drive input shaft 79 during travelling regardless of "ON (connection)" and "OFF (disconnection)" of the four-wheel drive clutch 78. Therefore, there is little influence by friction.

Herein, the four-wheel drive clutch 78 has a relatively high rotational speed. The four-wheel drive clutch 78 may be a wet clutch. Therefore, as the four-wheel drive clutch 78 rotates at a high speed while being bathed in oil inside the transmission case 6, a large loss in horsepower may occur. For this reason, according to the work vehicle 1 of the present embodiment, the four-wheel drive input shaft 79 has a gear ratio set to be lower than that of the front wheel driving shaft 76. As a result, it is possible to limit the rotational speed of the four-wheel drive clutch 78, thereby reducing a horsepower loss.

In this case, rotation of a gear connected to the four-wheel drive clutch 78 to drive the four-wheel drive clutch 78, for example, unevenness of the gear is detected with the rotational sensor in a non-contact manner. Also, the rotational sensor is provided at a location close to the inner wall of the transmission case 6, thereby facilitating attachment of the rotational sensor.

Alternatively, the four-wheel drive input shaft 79 may have a gear ratio set to be higher than that of the front wheel driving shaft 76. By increasing a speed of the four-wheel drive input shaft 79, a torque of the four-wheel drive input shaft 79 is decreased. Accordingly, a compact clutch having a small capacity can be used as the four-wheel drive clutch 78.

Further effects and variants can be easily derived by those skilled in the art. Therefore, broader aspects of the present invention are not limited to the specific details and representative embodiments as shown and described above. Accordingly, various modifications can be made without departing from the spirit or scope of the general inventive concept as may be defined by the claims and equivalents thereof.

REFERENCE SIGNS LIST

1: Work vehicle (tractor)
2: Machine body frame
3: Bonnet
4: Front wheel
5: Rear wheel
6: Transmission case
7: Power transmission device
70: Input shaft
71: Main clutch
72: Hydrostatic continuously variable transmission
731: Main shift output shaft
74: PTO clutch
742: PTO drive shaft
75: Sub-transmission mechanism
751: Sub-transmission mechanism input portion
752: Rear wheel driving shaft
76: Front wheel driving shaft
761: Gear
762: End portion
762a: Concave portion
77: Rear-wheel-power-diverter shaft
78: Four-wheel drive clutch
781: Output gear
782: Input gear
79: Four-wheel drive input shaft
791: Gear
792: End portion
792a: Convex portion
8: Operator seat
9: Steering wheel
E: Engine
G: Ground surface
h: Ground clearance
M: Mid-mower

What is claimed is:
1. A work vehicle, comprising:
a pair of left and right front wheels and a pair of left and right rear wheels each provided on a machine body frame;
a transmission case arranged below the machine body frame; and a power transmission device housed in the transmission case and configured to transmit a driving power from an engine to driving wheels,
the power transmission device comprising:
a front wheel driving shaft arranged in a lower inside portion of the transmission case and configured to transmit the driving power to the front wheels; and
a four-wheel drive clutch arranged above the front wheel driving shaft,
the four-wheel drive clutch being configured to switch between a two-wheel drive state in which the driving power is transmitted to the rear wheels, and a four-wheel drive state in which the driving power is transmitted to the front wheels and the rear wheels via the front wheel driving shaft,
wherein the power transmission device further comprises:
a rear wheel driving shaft for driving the rear wheels; and
a four-wheel drive input shaft configured to receive the driving power from the rear wheel driving shaft and then to transmit the driving power to the four-wheel drive clutch,
wherein the four-wheel drive input shaft is provided coaxially with the front wheel driving shaft, and an end portion of the four-wheel drive input shaft on a downstream side in terms of power transmission is loosely fitted with an end portion of the front wheel driving shaft on an upstream side in terms of power transmission.

2. The work vehicle according to claim 1, wherein the four-wheel drive clutch is arranged to be offset from the front wheel driving shaft in a horizontal direction and vertical direction.

3. The work vehicle according to claim 1, wherein in the two-wheel drive state only the rear wheels act as the driving wheels, and in the four-wheel drive state both the front wheels and the rear wheels act as the driving wheels.

4. The work vehicle according to claim 1, wherein
a circular-cylindrical convex portion is provided on an end surface of the end portion of the four-wheel drive input shaft, and
a circular concave portion is formed on an end surface of the end portion of the front wheel driving shaft.

5. The work vehicle according to claim 4, wherein the convex portion is loosely fitted into the concave portion so that a gap is formed between the convex portion and an inner wall of the concave portion.

6. The work vehicle according to claim 1, wherein the four-wheel drive clutch is arranged adjacent to an inner wall of the transmission case.

7. The work vehicle according to claim 6, further comprising:
a sensor configured to detect rotation of a gear for driving the four-wheel drive clutch,
wherein the sensor is provided in the inner wall of the transmission case.

8. The work vehicle according to claim 1, further comprising:
an implement disposed below the transmission case.

9. A work vehicle, comprising:
a set of front wheels and a set rear wheels provided on a machine body frame;
a transmission case arranged below the machine body frame; and
a power transmission device housed in the transmission case and configured to transmit a driving power from an engine to driving wheels,
the power transmission device comprising:
a front wheel driving shaft arranged below the transmission case and configured to transmit the driving power to the front wheels; and
a four-wheel drive clutch arranged offset from the front wheel driving shaft,
wherein the four-wheel drive clutch is configured to switch between a first drive state in which the driving power is transmitted to the rear wheels so that the rear wheels act as the driving wheels, and a second drive state in which the driving power is transmitted to the front wheels and the rear wheels via the front wheel driving shaft so that both the front wheels and the rear wheels act as the driving wheels,
wherein the power transmission device further comprises:
a rear wheel driving shaft for driving the rear wheels; and
a four-wheel drive input shaft configured to receive the driving power from the rear wheel driving shaft and then to transmit the driving power to the four-wheel drive clutch,
wherein the four-wheel drive input shaft is provided coaxially with the front wheel driving shaft, and an end portion of the four-wheel drive input shaft on a downstream side in terms of power transmission is loosely fitted with an end portion of the front wheel driving shaft on an upstream side in terms of power transmission.

10. The work vehicle according to claim 9, wherein the four-wheel drive clutch is arranged to be offset from the front wheel driving shaft in a horizontal direction and vertical direction.

11. The work vehicle according to claim 9, wherein
a circular-cylindrical convex portion is provided on an end surface of the end portion of the four-wheel drive input shaft, and
a circular concave portion is formed on an end surface of the end portion of the front wheel driving shaft.

12. The work vehicle according to claim 11, wherein the convex portion is loosely fitted into the concave portion so that a gap is formed between the convex portion and an inner wall of the concave portion.

13. The work vehicle according to claim 9, wherein the four-wheel drive clutch is arranged adjacent to an inner wall of the transmission case.

14. The work vehicle according to claim 13, further comprising:
a sensor configured to detect rotation of a gear for driving the four-wheel drive clutch,
wherein the sensor is provided in the inner wall of the transmission case.

15. The work vehicle according to claim 9, further comprising:
an implement disposed below the transmission case.

16. A work vehicle, comprising:
a pair of left and right front wheels and a pair of left and right rear wheels each provided on a machine body frame;
a transmission case arranged below the machine body frame; and
a power transmission device housed in the transmission case and configured to transmit a driving power from an engine to driving wheels,
the power transmission device comprising:
a front wheel driving shaft arranged in a lower inside portion of the transmission case and configured to transmit the driving power to the front wheels; and a four-wheel drive clutch arranged above the front wheel driving shaft,
the four-wheel drive clutch being configured to switch between a two-wheel drive state in which the driving power is transmitted to the rear wheels, and a four-wheel drive state in which the driving power is transmitted to the front wheels and the rear wheels via the front wheel driving shaft,
wherein the four-wheel drive clutch is arranged adjacent to an inner wall of the transmission case,
and wherein the work vehicle further comprises:
a sensor configured to detect rotation of a gear for driving the four-wheel drive clutch,
wherein the sensor is provided in the inner wall of the transmission case.

17. A work vehicle, comprising:
a set of front wheels and a set rear wheels provided on a machine body frame;
a transmission case arranged below the machine body frame; and
a power transmission device housed in the transmission case and configured to transmit a driving power from an engine to driving wheels,
the power transmission device comprising:
a front wheel driving shaft arranged below the transmission case and configured to transmit the driving power to the front wheels; and
a four-wheel drive clutch arranged offset from the front wheel driving shaft,
wherein the four-wheel drive clutch is configured to switch between a first drive state in which the driving power is transmitted to the rear wheels so that the rear wheels act as the driving wheels, and a second drive state in which the driving power is transmitted to the front wheels and the rear wheels via the front wheel driving shaft so that both the front wheels and the rear wheels act as the driving wheels,
wherein the four-wheel drive clutch is arranged adjacent to an inner wall of the transmission case,
and wherein the work vehicle further comprises:
a sensor configured to detect rotation of a gear for driving the four-wheel drive clutch,
wherein the sensor is provided in the inner wall of the transmission case.

* * * * *